(No Model.)

J. E. STANNARD.
VALVE.

No. 517,199. Patented Mar. 27, 1894.

Witnesses
Inventor
J. E. Stannard
Attorneys

UNITED STATES PATENT OFFICE.

JOHN E. STANNARD, OF SPRINGFIELD, MASSACHUSETTS.

VALVE.

SPECIFICATION forming part of Letters Patent No. 517,199, dated March 27, 1894.

Application filed July 24, 1893. Serial No. 481,357. (No model.)

*To all whom it may concern:*

Be it known that I, JOHN E. STANNARD, a citizen of the United States, residing at Springfield, in the county of Hampden and State of Massachusetts, have invented certain new and useful Improvements in Valves, of which the following is a specification.

My invention relates to valves, and it has for its object to provide a simple, cheap and effective valve which may be electrically controlled and operated by some motor force, and control a motor fluid, and to these ends it consists in a valve involving the features of construction, arrangement, and having the mode of operation substantially as hereinafter more particularly set forth.

Figure 1:
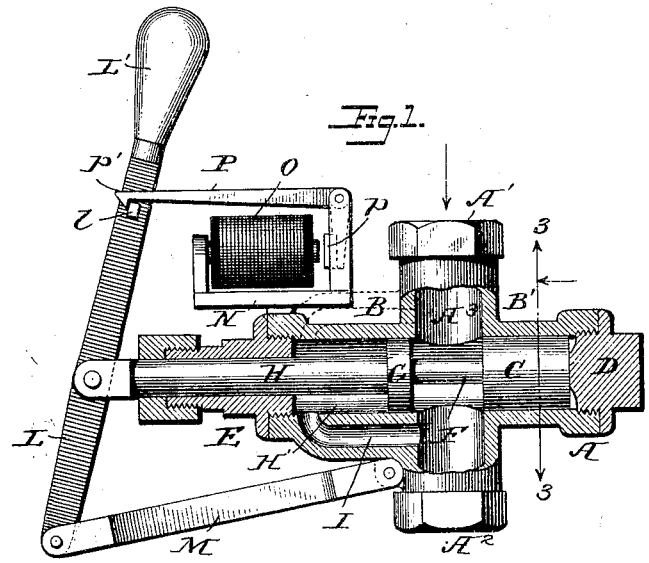
Figure 2:
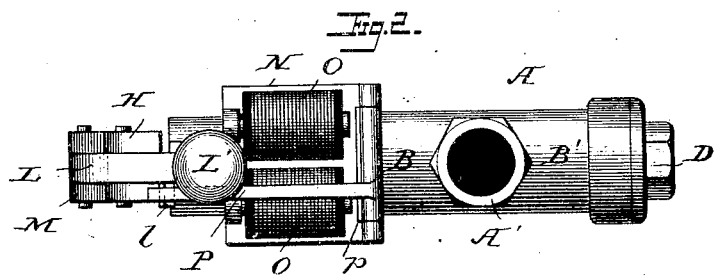
Figure 3:
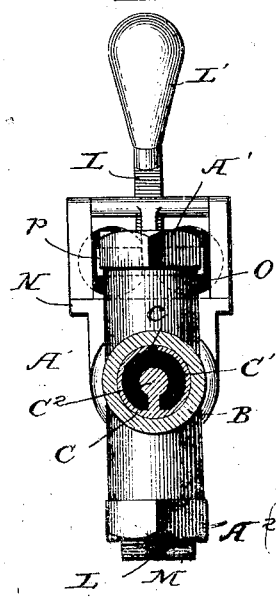

Referring to the accompanying drawings, Figure 1, is a vertical, longitudinal, part sectional view of a valve embodying my invention. Fig. 2, is a plan view of the same; and Fig. 3, is an end sectional view on the line 3—3, Fig. 1.

In the use of various motor fluids, such as steam, water and the like, it is common to have throttle valves, or similar devices for controlling the fluid, arranged at or near the point where the power of the fluid is used, and it is also desirable to have means whereby the motor fluid may be controlled from a distance. Especially, is this so in the use of steam for running engines, driving machinery of a factory, or the like, where in case of accidents at a distance from the engine, it is desirable to provide means so that any one may quickly stop the engine. It is also useful for other purposes, as controlling the supply of water to a portion of a town or city, and in many other cases which will suggest themselves to those skilled in the art, and the object of my invention is to provide a device which shall be controlled from any desired distance, and which when controlled, is automatic in its action to close the pipes or otherwise control the motor fluid, whatever it may be.

In the accompanying drawings, I have shown my invention as applied to a valve of peculiar construction, and while I prefer to use such a construction as that illustrated, it is evident that this construction may be varied by those skilled in the art, without departing from the principles of my invention, and substantially the same result be accomplished thereby.

The valve casing A, is adapted to be included in any distributing circuit of a motor fluid, being provided with couplings $A'$, $A^2$, and the case is extended laterally, as at B, $B'$, to receive the reciprocating valve C. The end $B'$, of the valve casing may be closed by a plug D, while the end B, is closed by a suitable gland or stuffing-box E. The valve C, is shown as connected to a rod F, to which is connected a piston G, and this is connected by a piston-rod H, passing through the gland or stuffing-box.

Extending from the passage-way $A^3$, of the valve casing, through which the motor fluid ordinarily passes, is a by-pass I, connecting the main passage-way $A^3$, and the space $H'$, around the piston-rod H, and it will thus be seen that under ordinary conditions, as those shown in Fig. 1, the steam or other motor fluid, in the main passages $A^3$, bears upon the contiguous face of the piston G, tending to force the valve to its seat, while the steam or other motor fluid passing through the passage I, into the chamber $H'$, presses on the opposite side of the piston G, tending to force the valve to the position shown in Fig. 1, but it will be observed that owing to the fact that the piston-rod reduces the effective area of this side of the piston, there is a greater pressure on the inner face of the piston G, and the valve is in unstable equilibrium, the pressure in the main passage being sufficient to overcome the pressure in the chamber $H'$, and close the valve C. I have shown the by-pass I, connected at the outlet end $A^2$, of the case, but it is evident that it may be connected at the inlet end $A'$, and in some instances this is preferable.

In order to maintain the valve C, in its open position, I provide a lever L, which is pivoted to a link M, secured to the valve casing A, the lever being pivotally connected to the piston-rod H, and shown as extending upward and provided with a suitable handle $L'$. Also mounted on the lever is a stud or projection $l$.

Mounted on some suitable part of the valve casing is a frame N, supporting an electro-magnet O, having an armature lever P, the armature $p$, of which is arranged adjacent the poles of the magnet, while the angular extended lever P, is provided with a catch $p'$, engaging the lug $l$, on the handle L. The coils of the magnet are connected by suitable conductors, not shown herein, to any suitable circuit-closing device, at any distant point, through the medium of which the magnet can be energized by any proper person, and when so energized, it will attract its armature $p$, raising the armature lever P, and releasing the lever L. When this is done, the pressure of the steam on the inner head of the piston G, will overcome the pressure of the steam or other motor fluid on the opposite head of the piston and force the valve to its seat, shutting off the motor fluid from the main passage-way, and as a consequence, stopping the engine or other machinery operated thereby.

It will be observed that by providing a steam-chest H', in connection with the main passage of the steam, I am enabled to prevent too rapid action of the valve, which might derange its operation when quickly released by the magnet, but the piston and the rod connected to the piston head can be so proportioned, according to the pressure of steam or other motor fluid used, as to insure a proper seating of the valve when released. The valve is restored to its normal position, shown in Fig. 1, by means of the handle L', of the lever, and there remains until again released in case of emergency, in the manner above indicated.

While an ordinary cylinder or flat slide valve may be used, I preferably use a hollow valve C, as shown more particularly in Fig. 3, wherein valve C, consists of a slotted cylindrical outside C', having a longitudinal slot $c$, and provided with an inward extension $C^2$, leaving steam spaces on each side of the central projection, so that the pressure of the steam in the valve will tend to expand the cylindrical portion, and tightly close the valve against leakage, making a tight joint, but at the same time permitting of freedom of movement in the valve seat.

What I claim is—

1. A valve, comprising a valve case having a main passage and lateral extensions, a valve mounted in the extensions and connected to a piston, a passage from the main passage leading to a steam chamber behind the piston, a piston rod connected to the piston, and an electro-magnet controlling said piston-rod, substantially as described.

2. In a valve, the combination with a valve casing, having a main passage and lateral extensions, a valve mounted in one of the extensions, a rod connecting the valve to the piston in the other extension, a piston-rod connected therewith, a lever connected to the valve case, a magnet mounted on the valve case, and an armature lever controlled by the magnet and controlling the lever, substantially as described.

3. In a valve, the combination with a casing having a main passage and lateral extensions, of a valve, valve piston and piston-rod mounted in the lateral extensions, a lever connected to the piston-rod, a link connecting the lever with the valve casing, a magnet mounted on the valve casing, and an armature lever controlled by the magnet and engaging a lug on the lever, substantially as described.

4. In a valve, the combination with a valve casing having a main passage and lateral extensions, of a valve, a valve piston a lever connected with the valve and a magnet controlling the lever, the valve being hollow to permit of its expanding to tightly fit the valve seat, substantially as described.

5. In a valve, the combination with a valve casing having a main passage and lateral extensions, of a valve and valve piston reciprocating in the extensions, the said valve comprising a slotted, hollow cylinder having a central, internal extension, substantially as described.

6. A valve, comprising a valve casing having a main passage and lateral extensions, a plug closing one of the extensions, a gland closing the other, a hollow valve reciprocating in the extensions, a piston connected to the valve, a piston-rod extending through the gland, a passage from the chamber around the piston-rod to the main passage of the valve, a lever connected to the piston-rod, a link connecting the lever with the valve casing, a magnet mounted on the valve casing, and an armature lever operated by the magnet and controlling the valve lever, substantially as described.

In testimony whereof I have signed my name to this specification in the presence of two subscribing witnesses.

JOHN E. STANNARD.

Witnesses:
F. H. STEBBINS,
GEO. F. FULLER.